(12) United States Patent
Graumann

(10) Patent No.: US 8,502,704 B2
(45) Date of Patent: Aug. 6, 2013

(54) METHOD, APPARATUS, AND SYSTEM OF STABILIZING A MOBILE GESTURE USER-INTERFACE

(75) Inventor: David L. Graumann, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1163 days.

(21) Appl. No.: 12/416,011

(22) Filed: Mar. 31, 2009

(65) Prior Publication Data

US 2010/0245131 A1    Sep. 30, 2010

(51) Int. Cl.
*H03K 17/94*    (2006.01)

(52) U.S. Cl.
USPC ............................................................ 341/20

(58) Field of Classification Search
USPC ................. 341/20, 22, 23, 24, 26, 27, 28, 29, 341/35
See application file for complete search history.

(56) References Cited

U.S. PATENT DOCUMENTS

| | | | | |
|---|---|---|---|---|
| 6,529,144 | B1 * | 3/2003 | Nilsen et al. ..................... | 341/20 |
| 2006/0061469 | A1 * | 3/2006 | Jaeger et al. ............. | 340/539.13 |
| 2008/0136679 | A1 * | 6/2008 | Newman et al. ................ | 341/20 |
| 2010/0240390 | A1 * | 9/2010 | Russ et al. ................. | 455/456.1 |

OTHER PUBLICATIONS

First Office Action mailed Jul. 22, 2011 for Chinese Patent Application No. 2010 10156404.1.
Non-Final Office Action mailed Nov. 8, 2011 for Japanese Patent Application No. 2010-076067.
Second Office Action mailed Jun. 4, 2012 for Chinese Patent Application No. 2010 10156404.1.
Amazon.com, "Times Watch #T5J992", http://www.amazon.com/Timex-T5J992-watch/dp/B000WNS99Y; accessed online Mar. 13, 2009; 5 pages.
Apple, "iPhone Features—Accelerometer", http://www.apple.com/iphone/features/accelerometer.html; accessed online Mar. 30, 2009; 1 page.
Bolt, Richard A., "Put-That-There: Voice and Gesture at the Graphics Interface", Architecture Machine Group, Massachusetts Institute of Technology, Cambridge Massachusetts, ACM 0-89791-021-4/80/0700-262, 1980.

(Continued)

*Primary Examiner* — Jennifer Mehmood
*Assistant Examiner* — Yong Hang Jiang
(74) *Attorney, Agent, or Firm* — Blakely, Sokoloff, Taylor & Zafman LLP

(57) ABSTRACT

The embodiments of the invention disclose a method, apparatus, and system for communicating via a user gesture with a mobile device having applications. The gesture acts like a user interface to a menu of applications that can be accessed while the user is in motion including while running, walking, riding, etc. In one embodiment, the method comprises determining a first multi-dimensional information for measuring motion of a first mobile device. The method further comprises receiving, by the first mobile device, a second multi-dimensional information for measuring motion of a second mobile device, the first and the second mobile devices being in motion relative to one another. The first and the second multi-dimensional information is used for filtering gesture motion from an underlying motion of the second mobile device to isolate the gesture motion from the underlying motion. The isolated filtered gesture motion is stabilized. In one embodiment, the method further comprises directing an action of the first mobile device in response to the isolated gesture motion.

20 Claims, 7 Drawing Sheets

OTHER PUBLICATIONS

Carter, G. C., et al., "Estimation of the Magnitude-Squared Coherence Function Via Overlapped Fast Fourier Transform Processing", IEEE Transactions on Audio and Electroacoustics, vol. AU-21, No. 4, Aug. 1973, pp. 337-344.

Knapp, Charles H., et al., "The Generalized Correlation Method for Estimation of Time Delay", IEEE Transactions on Acoustics, Speech, and Signal Processing, vol. ASSP-24, No. 4, Aug. 1976.

Lester, Johnathan, et al., "Are You With Me?—Using Accelerometers to Determine if Two Devices are Carried by the Same Person", Department of Electrical Engineering, University of Washington Department of Computer Science and Engineering, University of Washington Intel Research Seattle, 2004, 18 pages.

Wikipedia, "Wii Remote", http://en.wikipedia.org/wiki/Wii_Remote; accessed online Mar. 30, 2009 21 pages.

Zhao, Shengdong, et al., "earPod: Eyes-free Menu Selection using Touch Input and Reactive Audio Feedback", CHI 2007, Apr. 28-May 3, 2007, San Jose California, ACM 978-1-59593-593-Sep. 7, 0004; 10 pages.

* cited by examiner

METHOD, APPARATUS, AND SYSTEM OF STABILIZING A MOBILE GESTURE USER-INTERFACE

TECHNICAL FIELD

The embodiments of the invention relate generally to the field of communications between electronic devices and more particularly, to methods, apparatus, and system of communicating between mobile devices via gestures.

BACKGROUND

As mobile devices include more applications including applications for stock trading, access to email, phone, digital camera and video, global positioning system (GPS), text messaging, etc, it becomes cumbersome to access those applications and execute them while performing other tasks. For example, a person while running may be able to talk on a mobile phone via their headphones or Bluetooth enabled ear-piece, but won't be able to easily send a specific text message while talking and running, or be able to access a specific application on their mobile device that usually requires direct manual access such as logging into their brokerage account and selling a specific number of shares of a publically traded company on the stock exchange. Likewise, if a person desires instant access of an application on their mobile device while performing another activity, such as running, walking, etc., the person will most likely have to stop and manually access that application.

Unless easy instant access to applications is provided, most applications on mobile devices are not used (or executed) while the person holding the mobile device is performing other activities such as running, walking, driving, etc. One way to access applications instantaneously on mobile devices such as Palm handheld device, mobile phones such as iPhone, and other mobile devices collectively called mobile internet devices (MIDs), is via a pose or gesture motion of the user. Examples of instant access includes extracting clips of information from audible playback, recording and cataloging a five second To-Do list reminder, tagging locations and things in their environment, sending a quick "canned" reply message to an Instant Message program, quickly being reminded of a person's name in the ear, quickly muting a person's MP3 player, sending a "call you in five minutes" message to a telephone or email contact, etc.

However, there is a major barrier to realizing a functional motion-based user interface (UI) which is based on pose or gesture motion of the user while the user is in motion. This barrier includes the user's non-UI related physical movement which is present in the pose and gesture motion. These non-UI related physical movement destabilizes the fine grain selection of MID functions (or ability to select applications on the MID) while walking, riding, driving, running, etc.

BRIEF DESCRIPTION OF THE DRAWINGS

The embodiments of the invention will be understood more fully from the detailed description given below and from the accompanying drawings of various embodiments of the invention, which, however, should not be taken to limit the invention to the specific embodiments, but are for explanation and understanding only.

DETAILED DESCRIPTION

The embodiments of the invention discuss a method, apparatus, and system of instantaneous access to applications on a MID (or other mobile devices) by a motion-based user interface (UI). In one embodiment, the system filters the user's non-UI related physical movement (underlying motion) from the UI-related physical movement to achieve a stable UI-related physical movement to select an application from a plurality of applications hosted on the MID.

Figure 1:
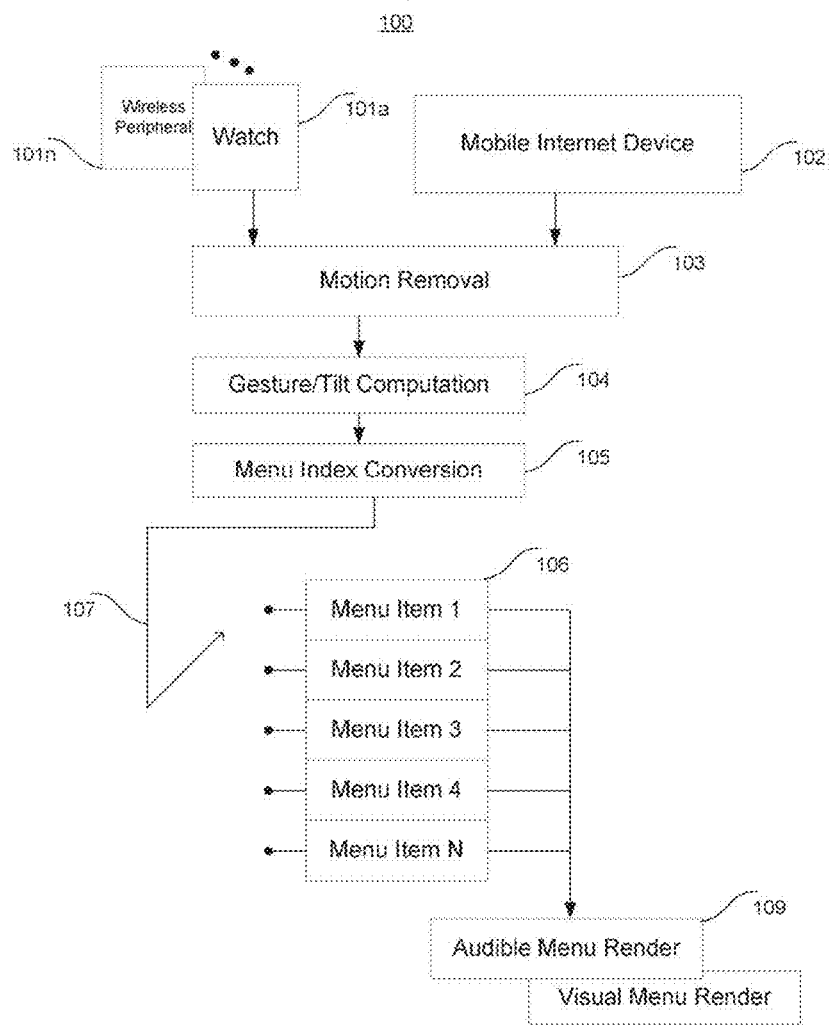
FIG. 1 is a system model illustrating wireless or wired peripherals such as a body-worn wrist watch with communication interface used for communicating with a mobile internet device (MID) via gestures according to one embodiment of the invention.

FIG. 1 shows a system level operation of gesture based UI stabilization according to one embodiment of the invention. The system 100 comprises an ensemble of devices 101a-n that can communicate a gesture to a mobile device such as a mobile internet device (e.g. MID) 102. The gesture from the ensemble is used to select, by selector 107, at least one of the menu items of 106. Before gesture can be applied to select a menu item, the gesture is identified, isolated, and stabilized from the non-gesture movement within the ensemble 101a-n and the MID 106. This process is shown by system level blocks 103 and 104. Details of the above process are discussed later in reference to FIG. 3. The gesture motion is then converted at 105 into a menu index associated with a menu of applications or tasks on the MID. It should be noted that the terms gesture and gesture motion are used interchangeably in the description.

In one embodiment, the MID may access a menu of applications hosted on another device. The selected menu from the stabilized gesture results in a signal such as an audio 109 or visual, or both. In one embodiment, this signal is communicated to the user who made the gesture. The gesture, in one embodiment, selects an application, from a plurality of applications, and executes the selected application without further generating an audio or visual communication to the user. For example, the gesture may execute a stock trade.

For reasons not to obscure the embodiments of the invention, the following description assumes a single body-worn device 101a instead of an ensemble of devices 101a-n. For same reasons, a single MID 102 is assumed. In one embodiment, there may be multiple MIDs. However, the same algorithm, method, and system are applicable to an ensemble of devices 101a-n and ensemble of MIDs.

In one embodiment, multiple MIDs or similar devices that are capable of measuring multi-dimensional device accelerations are part of the same system, where the multiple MIDs or similar devices are moving relative to the body-worn mobile device. In one embodiment, the similar devices include other body-worn devices or devices coupled with the body. Such an embodiment allows the MID, or the device executing the stabilization algorithm discussed in FIG. 3, to determine the underlying motion more precisely, within the gesture motion from the body-worn device, from multiple devices.

Figure 2:
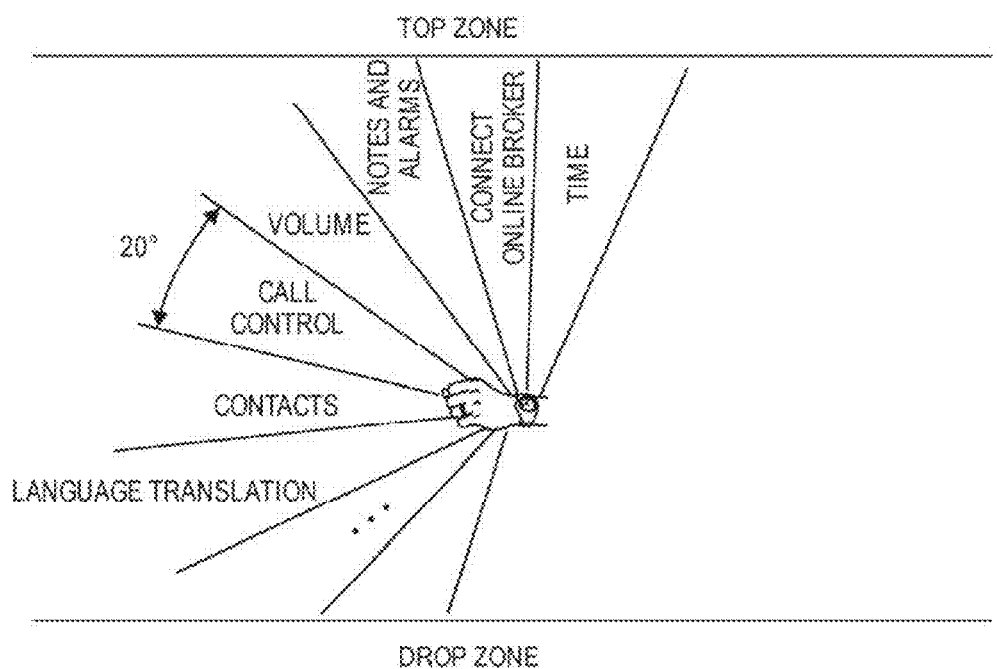
FIG. 2 is a gesture based user-interface with each application separated by a 20 degree rotation movement of a gesture according to one embodiment of the invention.

FIG. 2 shows an application menu separated by 20 degree angles according to one embodiment of the invention. The menu is associated with a device worn on the wrist of a person. In one embodiment, the body-worn device is a wrist watch. In other embodiments, the body-worn device is a ring on a finger.

In one embodiment, the gesture based UI shown in FIG. 2 is divided into three zones, top, drop, and middle. In other embodiments, fewer or more zones than the three zones listed may be defined for accessing various applications on the MID or via the MID. The middle zone, in one embodiment, has a variety of selectable menu applications. To access applications in the middle zone, the wrist is positioned parallel to the surface of the earth. It should be noted that the parallel position is a roughly parallel position i.e. the wrist does not need to be strictly parallel. By rotating the wrist counter clockwise, the wrist watch which is attached to the wrist also rotates counter clockwise. The rotation of the wrist generates a gesture which is stabilized and filtered from other non-gesture motions of the body. In one embodiment, the stabilized gesture is converted into an electronic signal that selects an appropriate application from the menu.

The first application in this example is a Time application. The gesture generated by the rotation of the wrist, and thus the watch attached to the wrist, will select the Time application on the MID. In one embodiment, upon selection of that application, the application is executed. In this particular example, time of the day is transmitted to a headphone of a user who is also wearing the wrist watch that transmitted the gesture motion. In one embodiment, the gesture causes the time of the day to be announced to the user without transmitting any signal to the headphone.

A further 20 degree counter clockwise motion of the wrist generates a gesture that when transmitted to the MID selects the next application in the menu after the Time application. In one embodiment, the volume application is selected by rotating the wrist directly by 80 degrees instead of 20 degree increments. Such direct rotation by a larger angle allows a user to select an application, from a menu of applications, instantaneously and directly with the gesture by rotating his or her wrist. In the above case, the user does not need to scroll through the applications on the MID linearly by rotating the wrist, and thus the watch, but can access the desired application instantaneously.

In one embodiment, the top zone and the drop zone may have another set of applications associated with rotation of the wrist. In one embodiment, the forearm is pointing away from the ground (pointing to the sky) and so the wrist rotation when the forearm is pointing away from the ground enables access to applications in the top zone. Similarly, in one embodiment, the drop zone of the MID is accessed when the forearm is pointing to the ground. Rotating the wrist in the drop position of the forearm allows the user to access applications in the drop zone of the MID. It should be appreciated that the above applications are instantaneously accessed via gestures while running, walking, or with other motions of the user.

Figure 3:
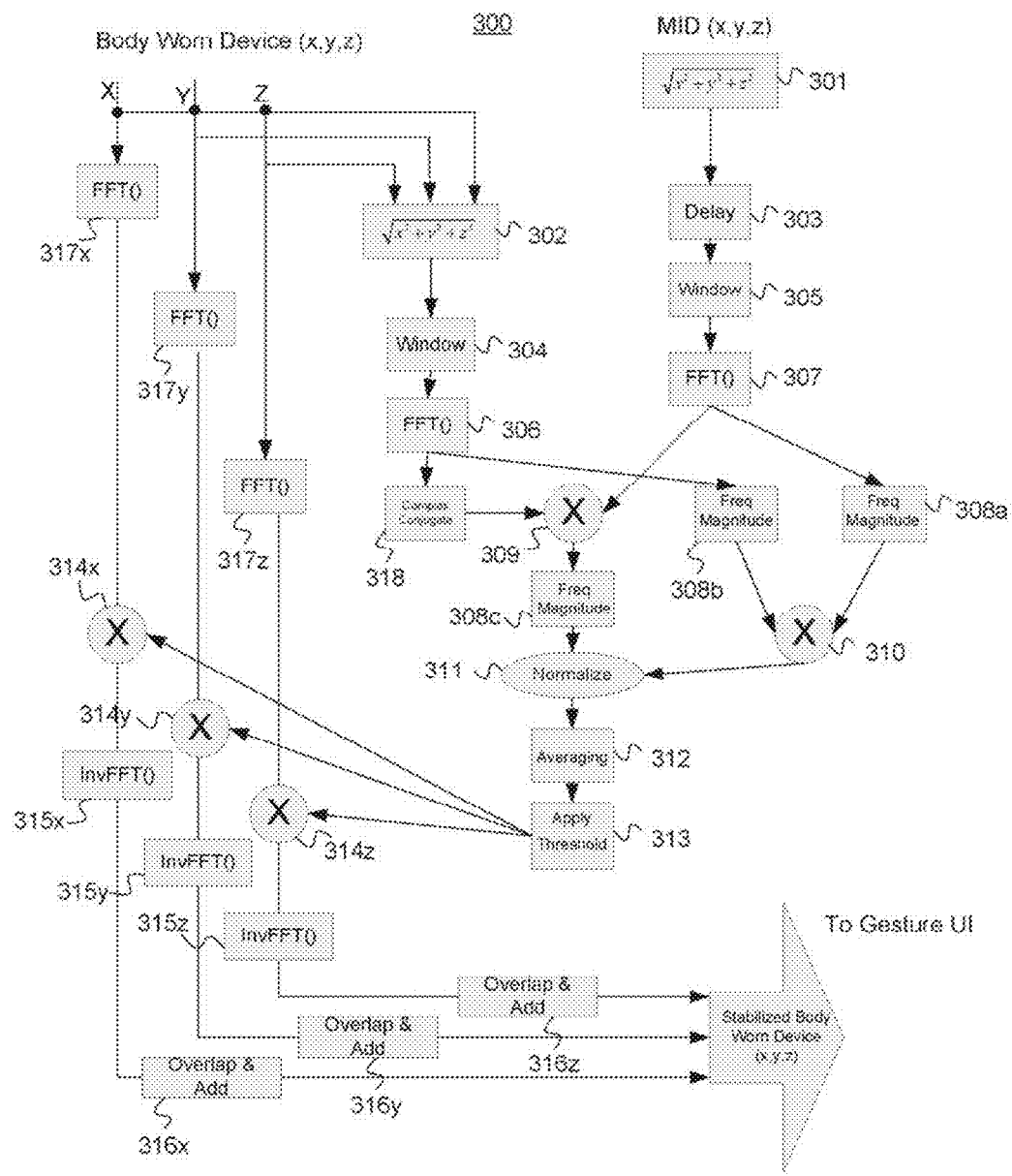
FIG. 3 is a detailed algorithm illustrating isolating and stabilizing a gesture motion according to one embodiment of the invention.

FIG. 3 illustrates an algorithm of the gesture based UI according to one embodiment of the invention. This algorithm filters non-UI related motion from gesture motion, thus isolating the gesture motion which is also stabilized. The body-worn device and the MID comprises an accelerometer or gyroscope or both. The purpose of the accelerometer and the gyroscope is to provide acceleration measurements on the devices. In one embodiment, the acceleration measurements include the angle of gravitational pull on the devices. The algorithm of FIG. 3, however, works with any device for measuring motion influences such as acceleration, including whether the device is an accelerometer or gyroscope or combination of both. In the following description of FIG. 3, an accelerometer is used instead of a gyroscope for the sake of describing the embodiments of the invention in simpler terms.

At 301 and 302 a three axes (x, y, and z) raw reading of the accelerometer is determined. In one embodiment, the x-axis maps to the user's forearm axis-of-rotation while the orthogonal y-axis and z-axis are used for measuring the user's acceleration. In one embodiment, the accelerometer reading from the body-worn device is transmitted to the MID. As mentioned above, in one embodiment there are multiple body-worn devices (ensemble of devices) and thus multiple accelerometer readings from each of the multiple body-worn devices are received by the MID. In another embodiment, there are multiple MIDs capable of receiving accelerometer readings from various body-worn devices.

The transmission of the accelerometer reading, in one embodiment, is performed by wireless means including Bluetooth technology, dipole antennas, etc. In another embodiment, the transmission of the reading is performed by wired means including USB (Universal Serial Bus) cables. In one embodiment, both wired and wireless means are available to communicate between the MID and the body-worn device.

In one embodiment, the MID is coupled with the same person wearing the body-worn device. For example, the MID may be located in a purse, wallet, pocket, or attached to a belt connected to the person making the gestures. The MID also includes its own accelerometer that generates three dimensional accelerometer reading (x, y, and z) for the MID.

Since the body-worn device is away from the MID, there is inherent delay between transmitting the accelerometer reading from the body-worn device to the MID. To compare the reading from the accelerometer of the MID with the reading from the accelerometer of the body-worn device, delay 303 is accounted for in the algorithm 300. In one embodiment, the delay is added to the MID side of the algorithm process before Fast Fourier Transform (FFT) is applied to the MID based accelerometer reading. In one embodiment, this delay is equal to the transmission delay of the accelerometer reading from the body-worn device to the MID. The delay is computed based on the location of the body-worn device and the MID. In one embodiment, the delay is within a pre-determined delay number or is a pre-determined delay number. For example, in one embodiment, the delay is within 100 ms of the MID accelerometer reading.

In one embodiment, each accelerometer reading is generated by sampling the reading at 100 Hz at ±2 g-force, where g-force is the gravitational force. In one embodiment, a 14 bit resolution is used to represent the accelerometer reading to discriminate linear motion of the devices. In other embodiments, different sampling speed and resolution may be used to represent the accelerometer reading.

At 304 and 305, a Hanning window is applied to the accelerometer reading. The Hanning window attenuates the first few and the last few samples of the accelerometer readings from both devices. The attenuation allows for smooth FFT operation because harsh edges of the samples are removed before FFT is applied to the accelerometer reading.

At 306 and 307, an FFT is applied to the windowed accelerometer reading. In one embodiment, a 64 point FFT is applied resulting in 64 FFT frequency bins.

As mentioned above, in one embodiment a combination of an accelerometer and a gyroscope provide acceleration information (including, for example, gravitational information) to compute a more accurate angle of acceleration of the devices (the MID and the body-worn device). In such an embodiment, the sampling rate of the gyroscope readings along the three axes (x, y, and z) is matched to a multiple of the sampling rate of the accelerometer. Because the gyroscope measures angular rotational velocities, the gradient of the gyroscope signal (reading) is used by subtracting each new gyroscope reading sample from its corresponding axis' previous values to create a delta value stream. Each of the three delta value derived from the three axis gyroscope reading is then squared and all three axes are summed to generate a single value. In one embodiment, the generated value is then combined with the linear acceleration reading from the accelerometer.

The combination, in one embodiment, is performed by adding the generated value directly to the accelerometer stream (reading) of those devices (prior to the Hanning window).

In one embodiment, the aggregate magnitude from multiple acceleration measuring devices including gyroscope, accelerometer, etc, is input into the FFT (e.g. 306 and 307) corresponding to the multi-dimensional stream associated with its device of origin.

To determine the presence of common motion between the MID and the body-worn device, magnitude squared coherence (MSC) is applied to the magnitude of the accelerometer reading between each device. The MSC is established by multiplying the complex conjugate 318 of the body-worn device FFT (306) output with the FFT (307) output of the MID device and then dividing the resultant product of the autocorrelation functions of each signal as shown by the normalization block 311. In one embodiment, normalization 311 is performed by dividing the difference in phases between the accelerometer readings from the MID and the body-worn device, and then dividing the difference with the maximum phase. The MSC process is shown by blocks 308-311. At 308*a-c*, the magnitude of the frequency domain signals (after FFT) is determined. In one embodiment, the magnitude of the frequency domain signals is determined by computing the square of the FFT signals. Blocks 309 and 310 are complex multipliers which, in one embodiment, establish the overall normalization power of both signals with and without their phase relationship, respectively.

In one embodiment, if the movement in the body-worn device and the MID is small, then the magnitudes applied for computing the normalized values is small leading to false coherence readings near unity (i.e. coherence of 1). To mitigate this problem, running average of the normalized sampled window is taken by block 312. In one embodiment, the normalized sampled window is the MSC. The averaging 312, in one embodiment, is achieved by integrating the normalized values. The averaged normalized result produces a continuous coherence reading between 0 and 1.

In one embodiment, coherence of 0 value means that the phases of the MID are not related to the phases of the body-worn device. Zero coherence may also mean that there is no motion noise in the gesture stream. In one embodiment, the coherence of a 1 in one of the 64 FFT frequency bins, indicates that there is no phase difference between the body-worn device and the MID device and that both devices are experiencing the same underlying motion—the devices are experiencing a common mode.

At 313, each frequency within the averaged signal is then compared to bin thresholds. In one embodiment, the threshold is set to a fixed 0.6 value in units of $e^{-|delta\_radians|}$, where $e=2.718281828$. When delta_radians is zero then the coherence is 1. When delta_radians is 0.5 coherence is 0.6. These values naturally fall out of the MSC computations and do not need to be computed explicitly. In another embodiment, the thresholds can be tapered across frequencies.

In one embodiment, coherence measurements above the threshold level triggers the application of a notch filter in that frequency bin for each of the three axes (x, y, and z) of the body-worn device such as a watch device. The notch filter is applied as an attenuation trough in that frequency prior to the inverse FFT. The trough of the notch filter, in one embodiment, is established by comparing the breadth of the common mode in the FFT of a single axis raw accelerometer reading from the body-worn device and the magnitude of the readings of the accelerometer in the MID. In one embodiment, while the magnitude of the MID values is used to find the common modes, their peaks and phases are not used directly for establishing the notches. Instead, the notch filter, in one embodiment, attenuates the strongest coherent signal (i.e. coherence of 1) and its previous and next harmonic found in each individual accelerometer stream of the body-worn device, thus constituting a comb filter on the motion. In one embodiment, the bandwidth of the notch filter (the trough size) is 2 FFT bins.

At 314*x-z*, the results from FFT operations at 317*x-z* of the accelerometer readings from the body-worn device are individually multiplied with the signal from the threshold unit 313. The multiplication results in attenuated common modes on each of the three body-worn device axis' FFTs.

At 315*x-z*, inverse FFT are independently applied to each of the three body-worn device FFT streams, according to one embodiment. The inverse FFT operations, in one embodiment, are followed by overlap-and-add reconstruction methods in 316*x-z*. The output of the overlap-and-add process is a stabilized gesture motion signal and is used for continuous monitoring for gesture movement intended for the MID interface. In one embodiment, the stabilized gesture selects an application on the MID via the MID gesture UI interface.

Once the non-UI motion (or underlying motion) is removed from the gesture transmitted by the body-worn device to the MID, the gesture motion is isolated. In one embodiment, the gesture or pose caused by rotation around the x-axis is determined by computing an absolute angle theta from ArcTan(AccelZ/AccelY). In another embodiment, the gesture or pose is determined by computing gesture based angles via Hidden Markov Models (HMM). The HMM, in one embodiment, generates a probability of each 20 degree angle wedge (as shown in FIG. 2) being the actual (or true) angle given the noisy accelerometer readings. The angle with the highest probability of being correct is selected as the final actual (true) angle intended by the gesture motion.

In one embodiment, hysteresis is applied to further stabilize the mapping of the gesture angle to the MID menu selection. Low latency audio clips, in one embodiment, may be used to notify the user of the current menu position on the MID menu selection. In one embodiment, a menu is selected upon a click of a button on the watch. The application associated with the selected menu, in one embodiment, is executed upon the click. The application associated with the selected menu is then executed when the selected menu position is identified by the stabilized gesture.

Just as the gesture motion is identified from other non-UI related motions via the stabilization algorithm explained by FIG. 3, the non-UI related motions, in one embodiment, are used to identify the motion of the user. For example, the non-UI related motion, or the underlying motion, may be one of driving, walking, running, etc. In one embodiment, an HMM is used for detecting the underlying motion after the gesture motion is removed from the underlying motion.

Figure 4:
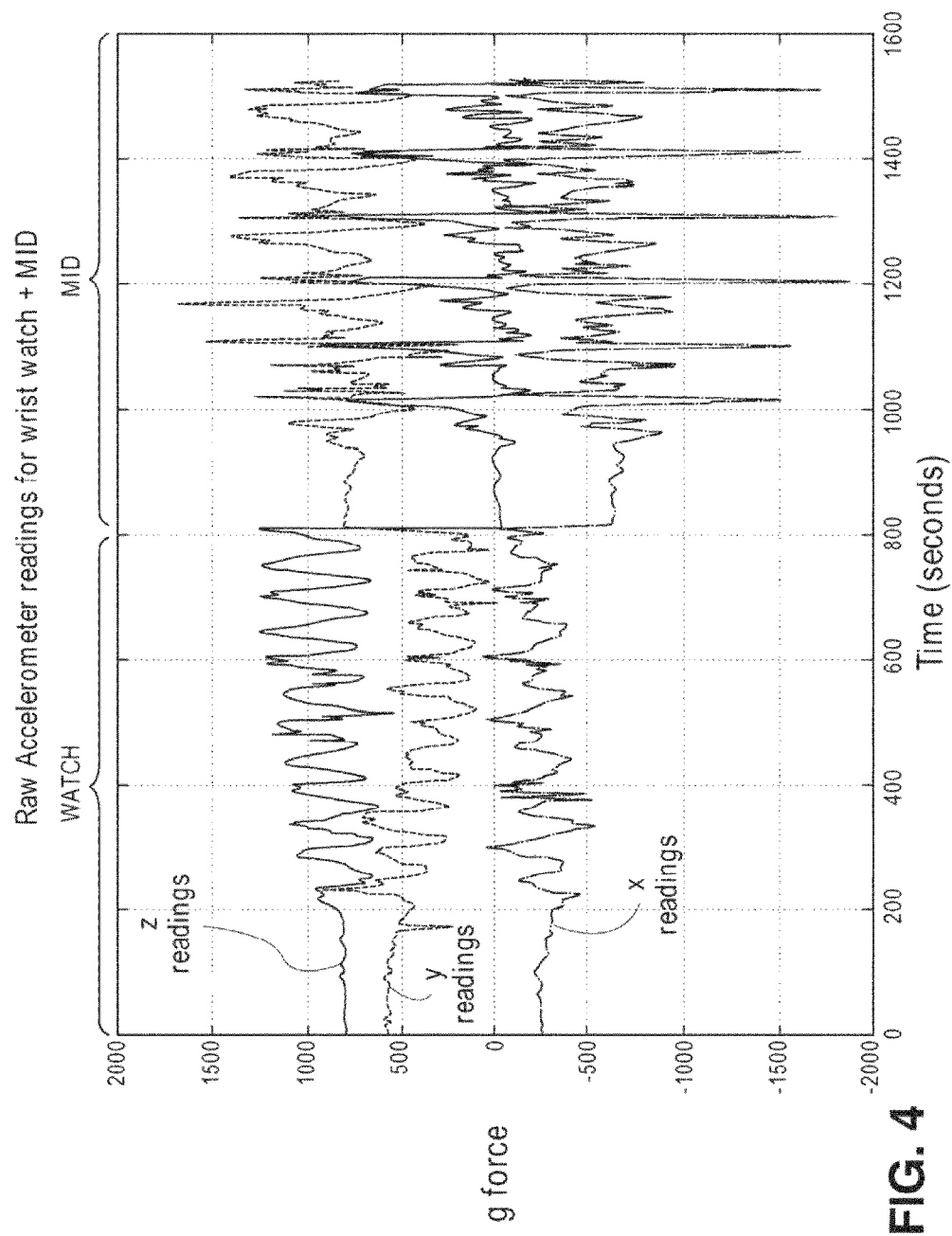
FIG. 4 is a comparison of a raw accelerometer data of a body-worn device and that of a MID according to one embodiment of the invention.
Figure 5:
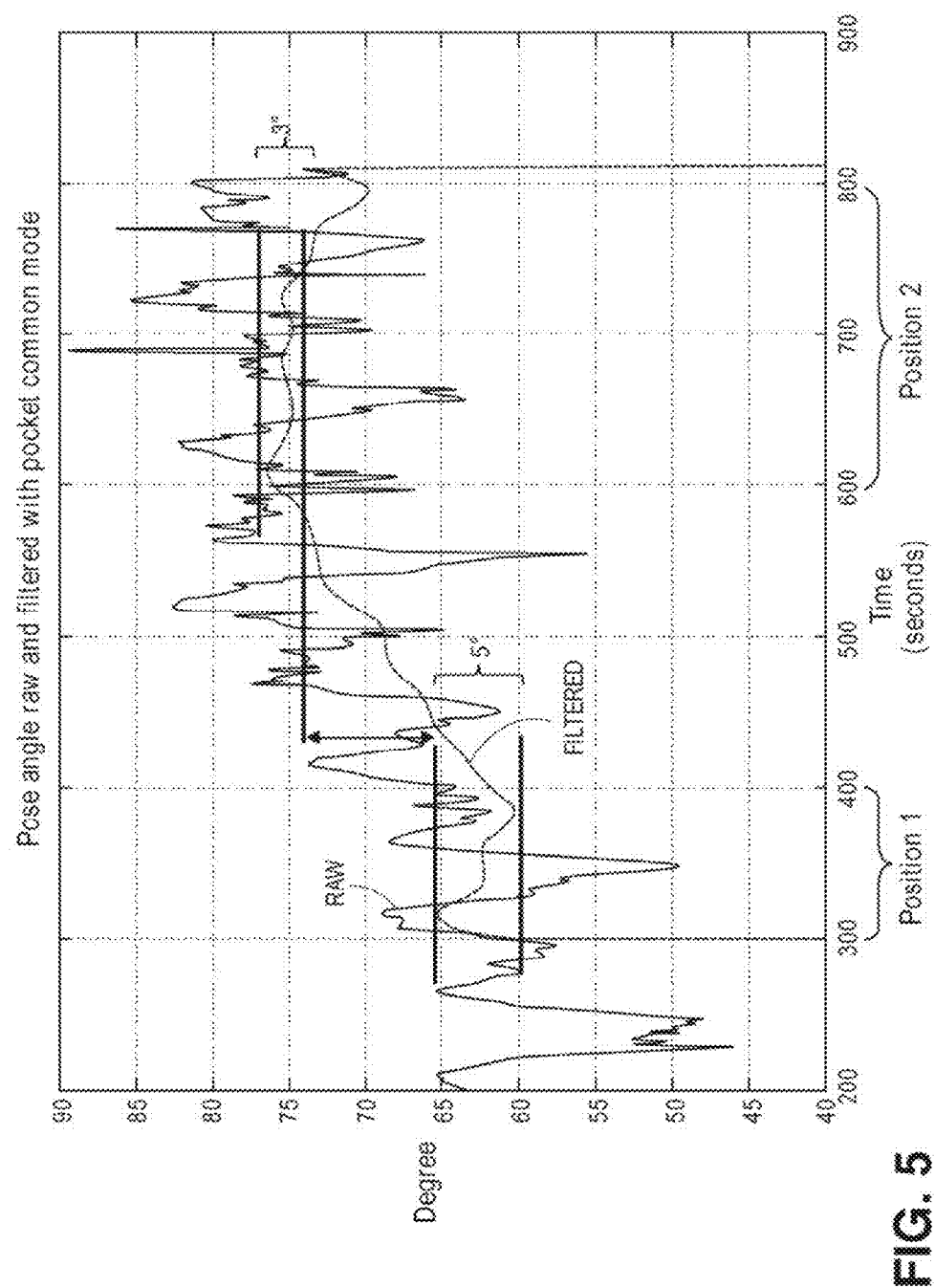
FIG. 5 is a stabilized and isolated gesture motion achieved by the disclosed method according to one embodiment of the invention.

FIGS. 4 and 5 show the operation of the gesture UI with and without applying stability to the gesture motion. FIG. 4 shows raw accelerometer data in time domain for all three axes, x, y, and z according to one embodiment of the invention. The left half side of the plot corresponds to the accelerometer reading of the body-worn device (e.g. a watch) on the wrist while walking. The reason why the x, y, and z accelerometer readings of the body-worn device does not match with the x, y, and z accelerometer reading of the MID (which may be in the user's pocket, purse, etc) is because both devices are in different orientation, relative to one another, when the user is walking. The magnitude of the g-force, which is plotted on the y-axis, is different for the body-worn device and the MID because the two devices are experiencing different magnitudes and harmonics of the underlying movement of the devices. In one embodiment, the x, y, and z accelerometer readings of the MID are used for constructing a notch filter for the body-worn device.

FIG. 5 compares the motion data, including gesture, when the stabilization algorithm, described in FIG. 3, is applied and when it is turned off. The dotted curve represents motion data when stabilization is applied while the solid curve represents motion data when stabilization is turned off. The x-axis on the plot is time in 0.05 second increments while the y-axis is degrees. In this example, the user rotated his/her wrist with attached body-worn device (such as a watch) while walking from position 1 to position 2. In this illustration, the user resided in position 1 between the time ranges of 300 to 400 0.05 second increments, and likewise, the user resided in position 2 between 500 to 750 0.05 second increments. During those time ranges of position 1 and 2, the user held the rotation angle of the writ stable while walking (the underlying motion). Without applying stabilization, the rotational angle of the wrist computed with the accelerometer readings of the devices (the body-worn device and the MID) cannot be used for selecting menu positions on the MID because the accelerometer readings are noisy while walking which makes it hard to distinguish between a gesture (rotation of wrist) made in position 1 and the one made in position 2.

However, with stabilization, the rotation angle computed with the accelerometer readings of the devices allows for a fine menu selection granularity. In this embodiment, the stabilization process achieves a 3-5 degree menu selection capability by the gesture motion (rotation of wrist). This means that by rotating the wrist by 5 degrees with stabilization on, a user can select a different menu position on the MID while walking.

It should be noted that while gesture motion in the above embodiments has been illustrated by rotation of wrist, other gesture motions can also be used to communicate with the MID while in motion. For example, gestures include flicks, rotation of wrist, and movement of other body parts on which a body-worn device can be coupled with.

Figure 6:
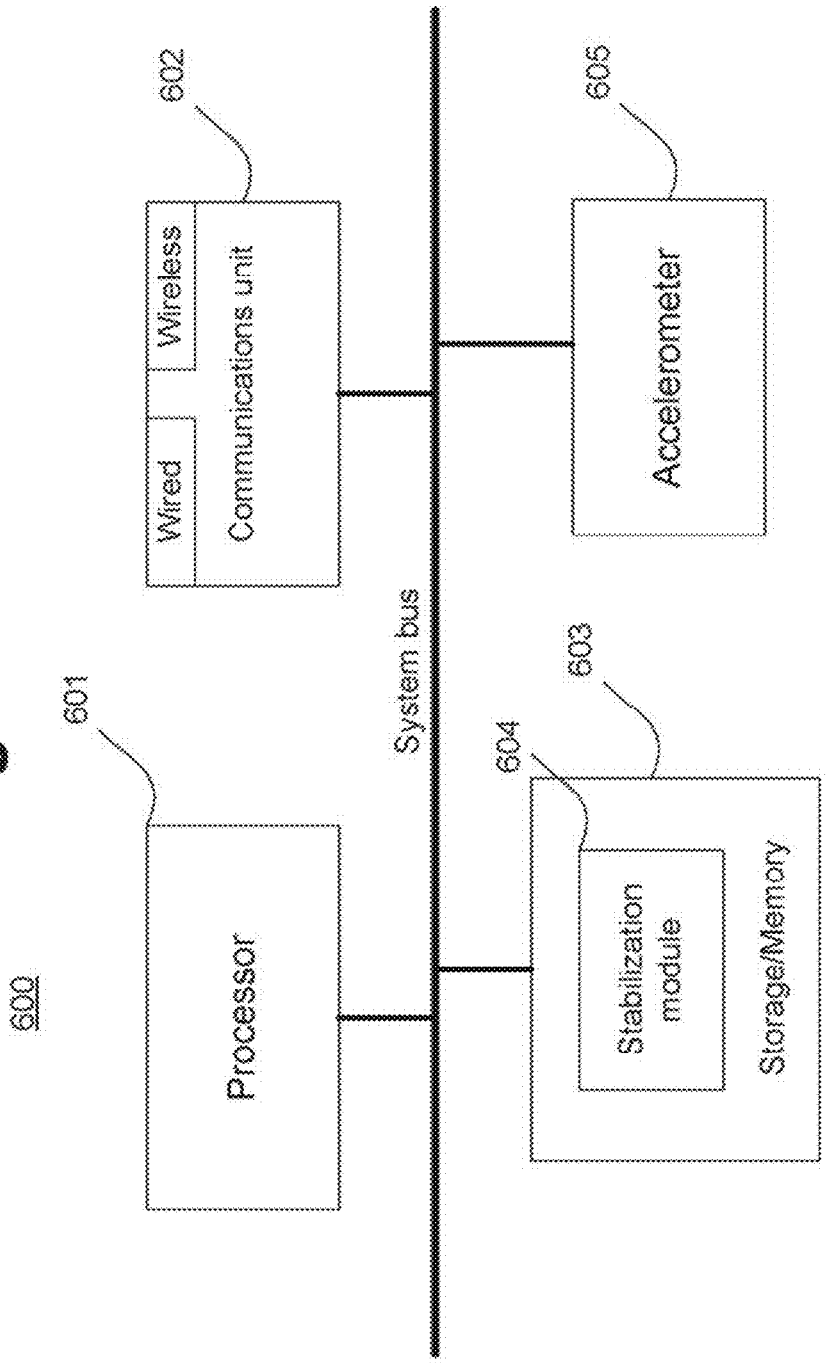
FIG. 6 is a high level architecture of a mobile internet device according to one embodiment of the invention.

FIG. 6 shows a high level architecture of an MID according to one embodiment of the invention. In one embodiment, the stabilization module 604 contains the algorithm described in FIG. 3. In one embodiment, the stabilization module resides in a storage area such as memory 603. Processor 601, in one embodiment, executes stabilization module 604. The body-worn device or an ensemble of devices, not shown in FIG. 6, communicates with the MID, in one embodiment, via the communications unit 602. The communication unit 602, in one embodiment, can communicate with external devices via wired and/or wireless means. In one embodiment, the wireless means include Bluetooth wireless technology. In one embodiment the wireless technology includes a dipole antenna. The MID, in one embodiment, includes an accelerometer 605 that provides three dimensional readings (along x, y, and z axis) for measuring linear acceleration. In another embodiment, a gyroscope may be used instead of an accelerometer. In yet another embodiment, a combination of an accelerometer and gyroscope is used in MID for computing linear and angular gravitational accelerations. In another embodiment, any acceleration measuring device (unit) may be used for 605. The devices 601-603 and 605, in one embodiment, communicate with one another via a system bus.

In one embodiment, all components of FIG. 6 including 601-605 are on a single processor capable of performing the functions of the separate devices 601-605.

The architecture shown in FIG. 6 and described above, in one embodiment, is also applicable to the body-worn device. For smaller and compact body-worn devices including a ring, some components such as the processor 601 and the memory 603, in one embodiment, are removed. In another embodiment of a compact body-worn device, all components described in FIG. 6 are in a single compact processor.

Elements of embodiments are also provided as a machine-readable medium for storing the computer-executable instructions. The machine-readable medium may include, but is not limited to, flash memory (such as memory 603 in FIG. 6), optical disks, CD-ROMs, DVD ROMs, RAMs, EPROMs, EEPROMs, magnetic or optical cards, or other type of machine-readable media suitable for storing electronic or computer-executable instructions. For example, embodiments of the invention may be downloaded as a computer program which may be transferred from a remote computer (e.g., a server) to a requesting computer (e.g., a client) by way of data signals via a communication link (e.g., a modem or network connection).

While the invention has been described in conjunction with specific embodiments thereof, many alternatives, modifications and variations will be apparent to those of ordinary skill in the art in light of the foregoing description. The embodiments of the invention are intended to embrace all such alternatives, modifications, and variations as to fall within the broad scope of the appended claims.

Figure 7:
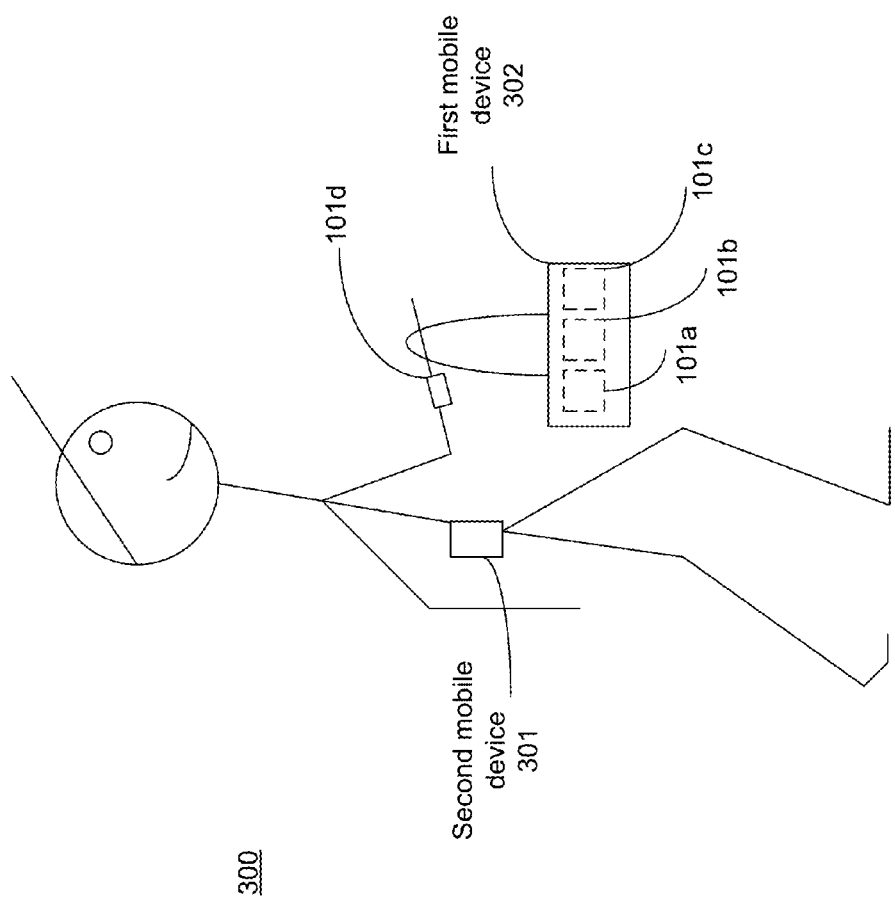
FIG. 7 illustrates a user with ensemble of devices and a second mobile device, according to one embodiment.

FIG. 7 illustrates a user 300 with ensemble of devices (first mobile device 301) and a second mobile device 302. In one embodiment, ensemble of devices includes devices 101a-d as discussed with reference to FIG. 1. The first mobile device 301 is in motion relative to the second mobile device 302 as the user 300 moves.

I claim:

1. A method comprising:
   determining a first multi-dimensional information for measuring motion of a first mobile device;
   receiving, by the first mobile device, a second multi-dimensional information for measuring motion of a second mobile device, the first and the second mobile devices being in motion relative to one another;
   filtering gesture motion of a user from an underlying motion of the second mobile device coupled to the user, the filtering to isolate the gesture motion from the underlying motion, the filtering based on the first and the second multi-dimensional information; and
   directing an action of the first mobile device in response to the isolated gesture motion.

2. The method of claim 1, wherein directing the action of the first mobile device comprises selecting an application of the first mobile device.

3. The method of claim 2, further comprising:
executing the selected application of the first mobile device.

4. The method of claim 1, wherein the underlying motion includes walking, running, driving, and riding.

5. The method of claim 1, wherein the second mobile device includes a plurality of mobile devices being in motion relative to the first mobile device.

6. The method of claim 1, wherein the first mobile device includes a plurality of mobile devices being in motion relative to the second mobile device.

7. The method of claim 1, further comprising:
determining presence of common motion between the second and the first mobile devices.

8. The method of claim 1, further comprising:
delaying the first multi-dimensional information by a time delay to match a receiving time of the second multi-dimensional information.

9. The method of claim 1, wherein the second and the first multi-dimensional information is generated by an accelerometer.

10. The method of claim 1, wherein the second and the first multi-dimensional information is generated by a gyroscope.

11. The method of claim 1, wherein the second and the first multi-dimensional information is generated by an accelerometer and a gyroscope.

12. An article of manufacture having a machine-readable non-transitory storage medium providing computer executable instructions that, when executed on an apparatus, cause the apparatus to perform a method, the method comprising: determining a first multi-dimensional information for measuring motion of a first mobile device; receiving by the first mobile device a second multi-dimensional information for measuring motion of a second mobile device, the first and the second mobile devices being in motion relative to one another; filtering gesture motion from an underlying motion of the second mobile device to isolate the gesture motion from the underlying motion, the filtering based on the first and the second multi-dimensional information; and directing an action in response to the isolated gesture motion.

13. The article of manufacture of claim 12, wherein directing the action comprises selecting an application of the first mobile device.

14. The article of manufacture of claim 13 having the machine-readable storage medium providing computer executable instructions that, when executed on the apparatus, cause the apparatus to perform the method, the method further comprising:
executing the selected application of the first mobile device.

15. The article of manufacture of claim 12 having the machine-readable storage medium providing computer executable instructions that, when executed on the apparatus, cause the apparatus to perform the method, the method further comprising:
determining presence of common motion between the second and the first mobile devices.

16. The article of manufacture of claim 12 having the machine-readable storage medium providing computer executable instructions that, when executed on the apparatus, cause the apparatus to perform the method, the method further comprising:
delaying the first multi-dimensional information by a time delay to match a receiving time of the second multi-dimensional information.

17. An apparatus comprising:
an acceleration measuring unit providing a first multi-dimensional information for measuring motion of the apparatus;
a communication unit to receive a second multi-dimensional information of a second mobile device in motion, the second multi-dimensional information for measuring motion of the second mobile device; and
a processor, coupled with the acceleration measuring unit and the communication unit, to filter gesture motion of a user from an underlying motion of the second mobile device coupled to the user, the filtering based on the first and the second multi-dimensional information.

18. The apparatus of claim 17, wherein the second mobile device is a body-worn device.

19. The apparatus of claim 17, wherein the acceleration measuring unit is a gyroscope.

20. The apparatus of claim 17, wherein the acceleration measuring unit is an accelerometer.

* * * * *